C. F. A. KELLOGG.
DEVICE FOR FASTENING AND HANDLING EGG CRATES.
APPLICATION FILED JULY 6, 1909.
967,525.  Patented Aug. 16, 1910.
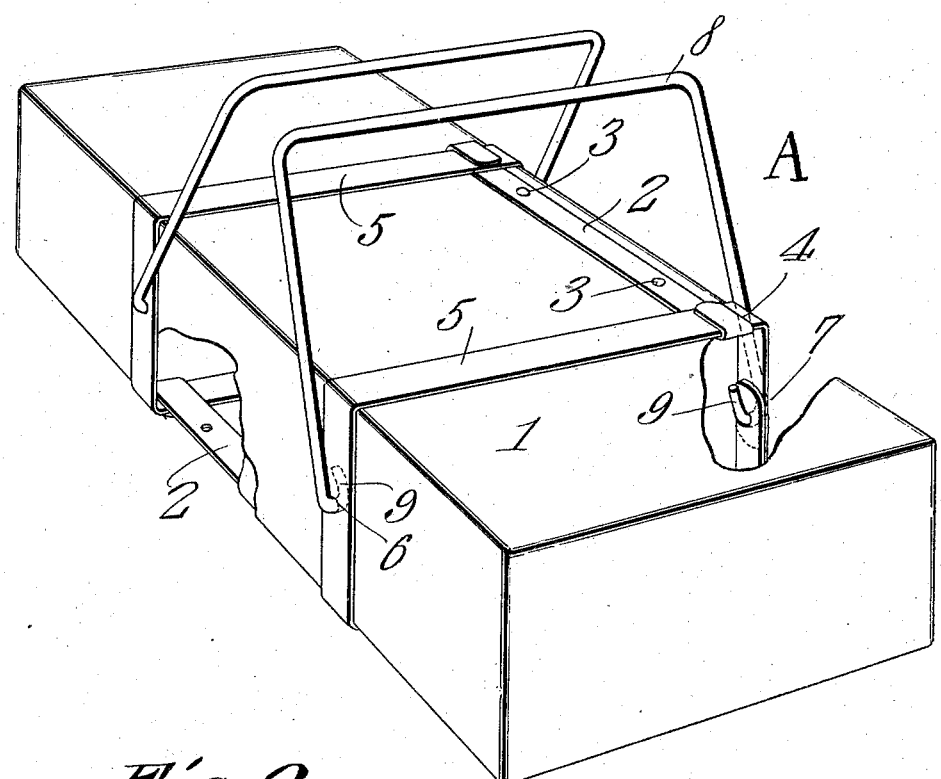
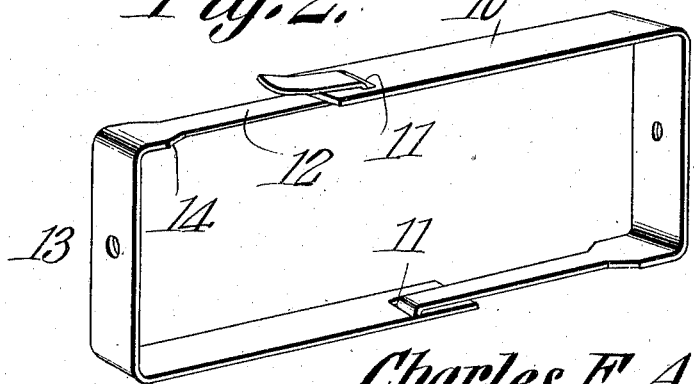
Witnesses
Inventor
Charles F. A. Kellogg.
By C. A. Snow & Co.
Attorneys

UNITED STATES PATENT OFFICE.

CHARLES F. A. KELLOGG, OF GLOSTER, MISSISSIPPI.

DEVICE FOR FASTENING AND HANDLING EGG-CRATES.

967,525.

Specification of Letters Patent. Patented Aug. 16, 1910.

Application filed July 6, 1909. Serial No. 506,118.

*To all whom it may concern:*

Be it known that I, CHARLES F. A. KELLOGG, a citizen of the United States, residing at Gloster, in the county of Amite and State of Mississippi, have invented a new and useful Device for Fastening and Handling Egg-Crates, of which the following is a specification.

My invention relates to new and useful improvements in handles for transporting and locking egg crates and is more particularly adapted to that class of egg crates which are used in the transportation of hatching eggs.

It contemplates the provision of a handle for this type of egg crate which will not only improve the method whereby the same may be transported but will permit the turning of the crate whenever it is desired, thus preventing the eggs from remaining in one posture for such a length of time that the contents adhere to the side thereof.

It further contemplates a handle of this class which may be attached and adjustable to all sizes of crates, consequently making the use of such a handle very inexpensive and practicable in the egg shipping business.

A still further object is to provide a means whereby the crate may be sealed and a notice placed thereon which will prevent the contents from being tampered with, without informing the consignee.

With the above and other ends in view the invention consists in the construction, combination and arrangement of parts all as hereinafter more fully described, specifically claimed and illustrated in the accompanying drawings, wherein, Figure 1 is a perspective view of my improved handle which is of the type adapted to be carried by one size of the crate or box. Fig. 2 is a modification of my handle showing one of the same which may be secured to all sizes and widths of crates or boxes.

Reference being had to the drawings, 1 is a crate or box provided with my improved device, indicated in general as A. This device comprises a pair of longitudinally extending metal strips 2 fastened on the top and bottom of the crate 1 by the rivets 3, adjacent to diametrically opposite corners of the crate. The loose ends 4 of these strips are bent upwardly to form a locking means for the transverse rectangular bands 5, which extend entirely around the box. These bands are so constructed that they have in each vertical side an orifice, the orifice 6 being situated in the integral side while the other is formed of the registering openings 7 in the overlapping extremities thereof, through the medium of which the ends of the bands are secured together by means of the handle 8 journaled in the orifices 6 and 7 and bent upwardly to form the hook 9 which permanently fastens the same thereto. The handles 8 are of substantially rectangular formation and are of such a size that they may be swung in a semi-circle about the ends of the crate.

The modification shown in Fig. 2 is formed of two U shaped members 10, each member having one arm provided in its extremity with a transverse slot 11, while the other arm has a reduced portion 12, having a shoulder 14 at its inner end and the orifices 13 adapted to receive the handle. The transverse slot of one of said members 10 is adapted to receive the reduced portion 12 of the other and vice versa, the same being bent upwardly to form a securing means whereby the same may be firmly clamped about the exterior of the box.

It can be readily seen from the foregoing that this device is of a very desirable nature, the semi-circular swing of the handles 8 making it possible to turn the same from one side to the other whenever it is desired thus eliminating the very objectionable quality in the crates now in use, of having the eggs remain in one posture for too long a period.

It is further noticed that to remove the handles the only operation necessary is to straighten the bent portions 4 of the longitudinal strip at the top and bottom of the crate and slide the transverse band from the crate by means of the handle.

Having thus fully described my invention what I claim as new and desire to secure by U. S. Letters Patent is:—

1. In a device of the class described, the combination with a series of receptacle locking members, comprising transverse parallel bands passing about and taking the form of said receptacle, having at one vertical side an orifice, and the other similar member formed of the overlapping extremities of the bands provided with registering openings therein, of handles pivotally mounted in said openings and adapted to take a semi-circular swing about the ends of the receptacle and means for securing the said bands to the receptacle comprising longitudinally extending bars attached to the top and bottom of the receptacle, on oppositely disposed sides having their extremities so formed that they may be bent outwardly to engage the said bands.

2. The combination with a receptacle, of longitudinal strips secured thereto, bands encircling the receptacle, and removably connected to the strips, said bands being apertured on one side of the receptacle, and the ends of the band on the opposite side of the receptacle overlapping, said overlapping portions having registering apertures, and handles pivotally mounted in the apertures of the bands.

In testimony that I claim the foregoing as my own, I have hereto affixed my signature in the presence of two witnesses.

CHARLES F. A. KELLOGG.

Witnesses:
 Hy. Burke,
 W. Y. McLain.